(12) United States Patent
Voillat (10) Patent No.: US 9,041,330 B2
(45) Date of Patent: May 26, 2015

(54) SENSORLESS BRUSHLESS MOTOR CONTROL DEVICE

(71) Applicant: Dassym SA, Neuchatel (CH)

(72) Inventor: Jean-Pierre Voillat, Montavon (CH)

(73) Assignee: DASSYM SA, Neuchatel (CH)

( * ) Notice: Subject to any disclaimer, the term of this patent is extended or adjusted under 35 U.S.C. 154(b) by 164 days.

(21) Appl. No.: 13/792,630

(22) Filed: Mar. 11, 2013

(65) Prior Publication Data

US 2014/0117902 A1    May 1, 2014

(30) Foreign Application Priority Data

Oct. 26, 2012  (EP) ................................. 12190286

(51) Int. Cl.
*H02P 6/18*    (2006.01)
(52) U.S. Cl.
CPC ...................................... *H02P 6/182* (2013.01)
(58) Field of Classification Search
CPC ........................................................ H02P 6/182
USPC ............ 318/400.01, 400.32, 400.14, 400.15, 318/700, 701, 721, 799, 400.34, 400.35; 388/909, 910, 928.1
See application file for complete search history.

(56) References Cited

U.S. PATENT DOCUMENTS

| | | | |
|---|---|---|---|
| 5,739,651 A | 4/1998 | Miyazawa et al. | |
| 5,998,946 A | 12/1999 | Kim | |
| 6,380,707 B1 * | 4/2002 | Rosholm et al. | 318/400.03 |
| 6,483,270 B1 * | 11/2002 | Miyazaki et al. | 318/700 |
| 7,583,039 B2 * | 9/2009 | Zhong et al. | 318/400.07 |
| 2003/0098666 A1 | 5/2003 | Shao et al. | |
| 2003/0234629 A1 | 12/2003 | Trifilo | |
| 2005/0104545 A1 | 5/2005 | Kikuchi | |
| 2006/0152181 A1 | 7/2006 | Shao et al. | |
| 2009/0033263 A1 | 2/2009 | Cassiano et al. | |
| 2009/0058336 A1 | 3/2009 | Narumi et al. | |
| 2009/0167226 A1 | 7/2009 | Chen et al. | |
| 2010/0007297 A1 | 1/2010 | Brown et al. | |

FOREIGN PATENT DOCUMENTS

| | | | |
|---|---|---|---|
| EP | 1109301 B1 | 6/2001 | |
| FR | 2846486 A1 | 4/2004 | |
| GB | 2176068 A | 7/1986 | |
| JP | 10225172 A * | 8/1998 | ................ H02P 6/18 |
| JP | 2001231285 A | 8/2001 | |
| WO | WO0004631 | 1/2000 | |
| WO | WO0145248 A1 | 6/2001 | |
| WO | WO2005099082 A1 | 10/2005 | |
| WO | WO2006021075 A1 | 3/2006 | |
| WO | WO2006091289 A1 | 8/2006 | |

OTHER PUBLICATIONS

European Search Report for EP 12 19 0286 dated Mar. 15, 2013.

* cited by examiner

*Primary Examiner* — Antony M Paul
(74) *Attorney, Agent, or Firm* — Pearne & Gordon LLP (57) ABSTRACT

A sensorless brushless motor control device includes a first amplification module common to all motor phases and generating an intermediary voltage signal, a voltage divider between each motor phase and a node on which the intermediary voltage signal is generated, and a computation unit. Each voltage divider generates a first corrected electromotive force with a predetermined average value. The computation unit controls the motor on the basis of the first corrected electromotive forces. By using only hardware components, the control device maintains the average of the corrected electromotive forces at the center of the analog acquisition zone of the computation unit.

15 Claims, 6 Drawing Sheets

SENSORLESS BRUSHLESS MOTOR CONTROL DEVICE

TECHNICAL FIELD

The present invention relates to a sensorless brushless motor control device.

STATE OF THE ART

A manual surgical instrument, notably dental, usually comprises a handpiece, for example a contra-angle handpiece, which can be provided with a tool, for example a drill, driven by a rotating motor. This motor can form a single unit with the hand piece or it can be a separate part and connected to the handpiece.

The control device of this type of instrument is often connected to the patient's chair, for example a dental chair, to a piece of furniture or generally to a housing that is connected to the manual instrument by means of a flexible hose connection containing electric wires and tubes for air and water flow.

The motor used for driving the tool is more and more often a sensorless brushless motor. This motor can be a three-phase motor, i.e. comprising three motor phases.

In a sensorless brushless motor, one or several permanent magnets form the rotor and a set of coils forms the stator. Since this type of motor is brushless, a control device must ensure the current switching in the stator coils depending on the rotor's angular position, which therefore needs to be known accurately.

Since a sensorless brushless motor is without position sensors, in order to estimate the instantaneous position of the rotor, it is possible to analyze with a calculation unit the electromotive forces (EMF) that are generated in the stator coils by the turning rotor.

The device for controlling this type of motor can also be used as servo module, for example as servo module for controlling the motor's speed.

Figure 1:
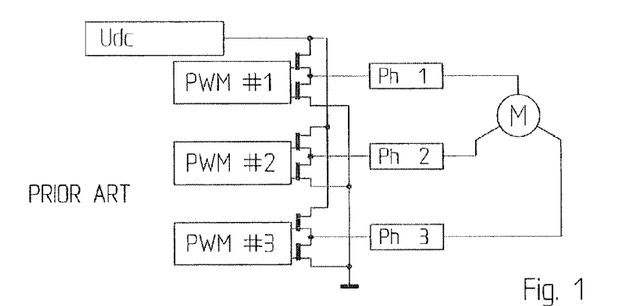
FIG. 1 illustrates an example of known motor control device.

FIG. 1 illustrates an example of a known control device of a sensorless brushless motor M, powered by a fixed voltage Udc. Each phase Ph1, Ph2 and Ph3 of the motor M is associated with a personalized PWM (Pulse Width Modulation) circuit for generating a three-phase sinusoidal rotating field. In this case, the electro-magnetic fields (EMF) are highly disturbed and the rotor position is then generally acquired by means of a Kalman filter.

Using a Kalman filter entails several disadvantages, the main one of which is the time required to detect the position of the rotor, since this type of filter must analyze several periods of EMFs before finding their fundamental frequency, which is necessary for determining the position of the rotor.

Figure 2:
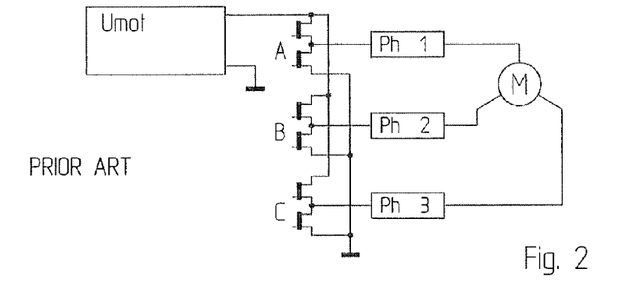
FIG. 2 illustrates another example of known motor control device.

FIG. 2 illustrates another example of known control device of a sensorless brushless motor M. In this case, a single continuous voltage regulator is laid out for generating a continuous voltage signal having a value Umot that is directly proportional to the rotation speed of the motor M. For example, Umot can belong to the range 0V-32V: the value 0V corresponds to a zero rotation speed of the motor M, the value 32V corresponds to a maximum rotation speed of the motor M, for example and in a non-limiting way 40'000 rotations per minute. The continuous voltage regulator is common to the three motor phases Ph1, Ph2 and Ph3.

The sequential distribution of Umot at the three motor phases Ph1, Ph2 and Ph3 is ensured by means of three commutators A, B, C. Each commutator can comprise two switches, for example two IGBT (Insulated Gate Bipolar Transistor) or MOSFET (Metal Oxide Semiconductor Field Effect Transistor) transistors and can have three possible states: Umot, Hi (high impedance) and 0 Vdc.

Figures 3A, 3B, 3C, 3D, 3E:
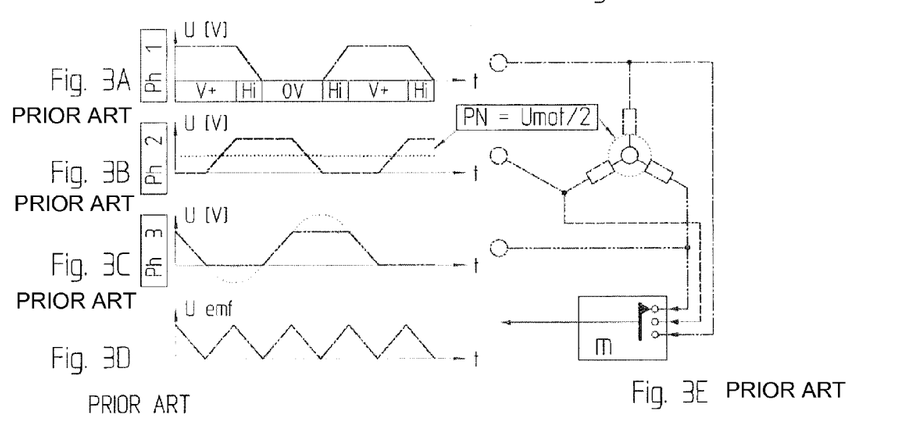
FIGS. 3A to 3C illustrate for each of the three motor phases of a collectorless brushless motor voltage portions that generate each phase and that are fragments of EMFs that can be detected by a known motor control device.
FIG. 3D illustrates the EMFs obtained by multiplexing the signals of FIGS. 3A to 3C.
FIG. 3E illustrates a three-phase brushless collectorless motor and the multiplexer for obtaining the EMFs of FIG. 3D.

As can be seen in FIGS. 3A to 3C, thanks to these commutators A, B, C, each phase Ph1, Ph2 and Ph3 finds itself successively at Umot [V+], at high impedance [Hi], or at zero volt [0V]. The neutral point PN, visible in FIG. 3E, maintains a constant voltage equal to Umot/2.

Each phase Ph1, Ph2 and Ph3 during the "high impedance" status Hi supplies a portion of the voltage generating the phase Ugn, for example the voltage Ug3 represented in FIG. 3C by the dotted line, to which is added the value PN, visible in FIG. 3B.

A multiplexer m, visible in FIG. 3E, makes it possible to juxtapose the detectable portions Ugn, so as to obtain the EMF signals illustrated in FIG. 3D.

These EMFs are in a "raw state". In this context, this expression indicates that the EMFs are taken directly on the motor phases of the motor M, i.e. without being modified nor manipulated.

As discussed, these EMF signals must be acquired and processed by a computation unit, for example a microprocessor, in order to calculate the instantaneous position of the rotor. In the ideal case, illustrated in FIG. 4, the EMFs have amplitudes that are consistent with the characteristics of the computation unit, notably with its supply voltage Zadc, for example 3.3 V, corresponding to the maximum value of its analog acquisition zone [0, Zadc]. If, for example and in a non-limiting way, the supply voltage Zadc of the computation unit is equal to 3.3V, the amplitudes of the EMFs in the ideal case will be comprised between 0V and 3.3V, as illustrated in FIG. 4.

The EMFs in fact oscillate between a maximum value and a minimum value. The difference of these two values defines the amplitude of the EMFs. The average of the EMFs is defined as the arithmetic average between their maximum value and their minimum value.

Figure 4:
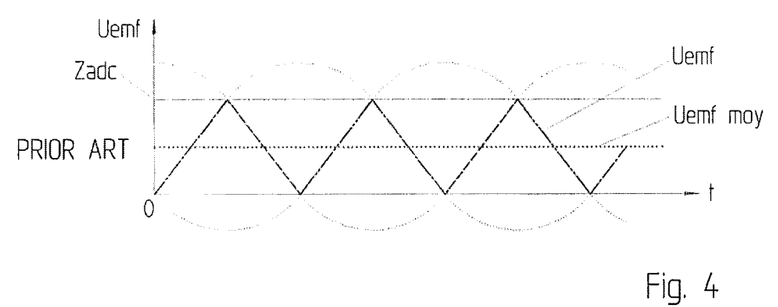
FIG. 4 illustrates the EMFs in an ideal configuration.

The case of FIG. 4 is only ideal, since in reality depending on the speed of the motor M, in other words on its supply voltage Umot, the average of the EMFs (or neutral point, PN) is not centered on the average of the supply voltage of the computation unit Zadc, for example it is greater or less than Zadc/2, which results in a calculation of the rotor's position that is not accurate nor reliable, and thus in a non optimum synchronization of the commutations of the motor phases with the rotating field generated by the rotor.

Furthermore, the amplitude of the EMFs can vary in large proportions depending on the speed of the motor M, in other words on its supply voltage Umot, which always has the consequence a calculation of the rotor's position that is neither accurate nor reliable.

Figure 5A:
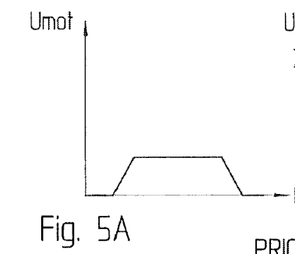
FIGS. 5A and 5B illustrate respectively the voltage Umot for regulating the motor in case of low speed and the corresponding EMFs.
Figure 5B:
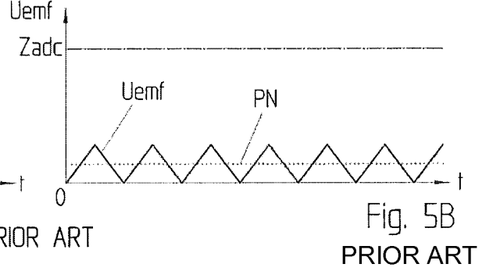

FIG. 5A illustrates the supply tension Umot corresponding to a "low" speed of the motor M. In this context, the expression "low speed" indicates a rotation speed of the sensorless brushless motor M that is lower than 2'000 rotations per minute, for example less than 1'000 rotations per minute. Due to this low speed, the corresponding EMFs, illustrated in FIG. 5B, have a small amplitude relative to Zadc. In other words, the computation unit will not be able, on the basis of these weak EMFs, to calculate the rotor's position accurately and reliably, with all the consequences mentioned above.

Low rotation speeds of the motor M, on the order of magnitude of several hundreds of rotations/minute, for example 200 rpm, can be used in a dental instrument (for example in a dental instrument for root canal treatments), whence the necessity of finding a solution that would make it possible to have a rotation of the motor M that is controlled and optimal even at low motor rotation speeds.

Figure 6A:
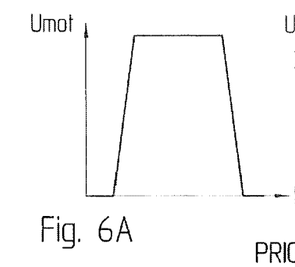
FIGS. 6A and 6B illustrate respectively the voltage Umot for regulating the motor in case of high speed and the corresponding EMFs.
Figure 6B:
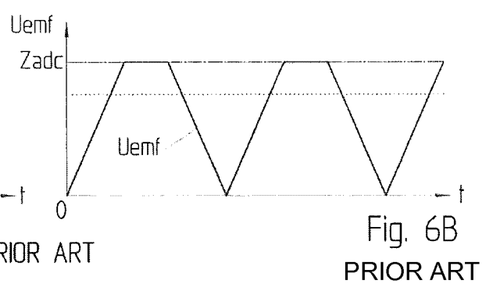

The same type of problem exists for "high" speeds of the motor M, as illustrated in FIGS. 6A and 6B. In this context, the expression "high speed" indicates a rotation speed of the sensorless brushless motor M greater than 10'000 rotations per minute.

High rotation speeds of the motor M, for example 40'000 rpm, are used in a dental instrument, for example in a dental instrument for drilling, whence the necessity of finding a solution that would make it possible to have a rotation of the motor M that is controlled and optimal even at high motor rotation speeds too.

Speeds between 2'000 and 10'000 rotations per minute are "average" speeds that generally do not cause saturation problems.

Different solutions have been proposed to try and resolve the problems associated with low and/or high rotation speeds of the motor M.

For example, US2005104545 proposes to use two comparator circuits with different reference voltages depending on the motor's speed. An analogous solution is described in WO06021075.

U.S. Pat. No. 5,998,946, U.S. Pat. No. 5,739,651 and EP1728315B1 propose to use two different detection mechanisms depending on the rotation speed of the motor.

US2009167226 and US2009033263 describe to stop the power supply to the motor periodically by means of a "mask" circuit in order to avoid the incorrect detection of the EMFs. This solution provides the presence of an additional connection for the neutral point (CT).

EP1109301 mentions determining the position of the rotor by amplifying the variation of the resonance frequency of an oscillating circuit.

All these documents describe solutions that are bulky, complicated and that do not allow high and low rotation speeds of a sensorless brushless motor to be managed simultaneously and satisfactorily.

US2003234629 mentions solving the problem of the low rotation speeds only by correcting the amplitude of the EMFs with a voltage divisor for each motor phase between each electromotive force in raw state taken directly on the motor phases of the motor and the mass.

In this document, the EMFs thus reduced are sent to an automatic gain control (AGC) circuit that puts to scale the value of the EMFs detected for each of the phase windings to a normalized value. The computation unit controls the automatic gain control circuit in a dynamic manner. This solution makes it possible, in other words, to modify the amplitude of the EMFs so as to make them compatible with the supply voltage of the computation unit.

The solution proposed in this document is slow since the AGC is controlled by the computation unit. In other words it is not instantaneous, since the amplitude of the EMFs is corrected following a signal coming from the computation unit that is generated after having analyzed the amplitude of the EMFs to be corrected: the calculations of the computation units can thus only start after at least one EMF period has been measured, to which the computation time must be added and in the case of sudden speed variations, these delays can cause problems.

Furthermore, this document does not acknowledge the high speeds problem nor does it propose solutions for motors with constant rotation speeds, without having to modify the amplitude of the EMFs, notably at start-up.

Finally, this solution uses AGCs, which are costly components, and which often have a moderate gain accuracy, thus affecting the accuracy of the calculation of the rotor's position.

BRIEF SUMMARY OF THE INVENTION

One aim of the present invention is to propose a control device for a sensorless brushless motor that is free from at least some of the limitations of the known control devices mentioned here above.

Another aim of the invention is to propose a sensorless brushless motor control device that enables this control without delay, i.e. in real time.

Another aim of the invention is to propose a control device for a sensorless brushless motor that enables both low and high rotation speeds to be controlled in a simple and reliable manner.

Another aim of the invention is to propose a sensorless brushless motor control device that is simpler and more economical than the known devices.

According to the invention, these aims are achieved notably by means of a sensorless brushless motor control device according to claim 1.

The sensorless brushless motor control device according to the invention comprises:
  a first amplification module common to the motor phases and laid out for generating an intermediary voltage signal,
  a voltage divider between each motor phase and a node on which the intermediary voltage signal is generated,
  a computation unit laid out for controlling this motor on the basis of these first corrected electromotive forces.

Advantageously, the device according to the invention also comprises:
  a continuous voltage regulator laid out for generating a continuous voltage signal,
  commutators laid out for distributing sequentially the continuous voltage signal to the motor phases of the sensorless brushless motor,
  a computation unit.

Advantageously, each voltage divider is laid out for generating a first corrected electromotive force having a predetermined average value and which is used by the computation unit in order to control the motor, on the basis of these first corrected electromotive forces, notably in order to calculate the position of the motor's rotor.

In the context of this invention, the expression "average value" of a voltage, for example of an electromotive force, indicates the value obtained by arithmetically averaging between the maximum value and the minimum value of the voltage being considered.

Advantageously, the predetermined average value is essentially equal to half of the value of the supply voltage of the computation unit. In this context, the adverb "essentially" indicates that small differences between the average value of the first corrected electromotive force and that of the motor supply voltage, for example associated with measuring tolerances, are acceptable.

According to the invention, the first corrected electromotive forces are automatically centered on the average of the supply voltage of the computation unit without using AGCs or feedback loops with the computation unit. In other words, by using only hardware components, notably the first amplification module and the voltage dividers for each motor phase, it is possible to center in an accurate and reliable manner the average of the first corrected electromotive forces so that it is essentially identical to half of the supply voltage of the computation unit.

Not only is this solution therefore quicker than the known solutions that use the software of the computation unit which is in the feedback loop of the AGCs, it also makes it possible to work in real time since it is based on hardware components only.

Furthermore, as the predetermined average value is essentially equal to half of the value of the supply voltage of the computation unit, this solution enables the average of the first corrected EMFs to be centered in the acquisition zone of the computation unit without necessarily having to modify the amplitude of the first electromotive forces as well.

Even in the presence of a variation of the rotation speed of the motor, i.e. of the continuous voltage signal Umot, this solution makes it possible to obtain an average value of the first corrected electromotive forces that is constant independently of the voltage value of this continuous tension signal.

Advantageously, the first amplification module and each voltage divider also allow each first corrected electromotive force to have a maximum value lower than or at most equal to the supply tension of the computation unit and a minimum value greater than or at most equal to 0V. In other words, the inventive device enables the first corrected electromotive forces to be compatible with the acquisition zone of the computation unit, whilst avoiding saturations.

In a preferred embodiment, the first amplification module is laid out for generating the intermediary voltage signal from the continuous voltage signal and from a first reference voltage signal. Advantageously, this first reference voltage signal is determined as a function of the supply voltage of the computation unit.

In another variant embodiment, the first amplification module comprises a first operational amplifier and two resistors. Advantageously, the ratio between these resistors is determined as a function of the supply voltage of the computation unit.

In another variant embodiment of the invention, the device also comprises a second amplification module for each motor phase, wherein each second amplification module is laid out for amplifying the first corrected electromotor force in a variable manner as a function of the continuous voltage signal and for generating a second corrected electromotive force. In this variant embodiment, the computation unit is laid out for calculating the rotor's position on the basis of these second corrected electromotive forces.

In other words, in this latter embodiment, it is possible to modify the electromotive forces gain according to the motor speed so as to maintain amplitudes that can be processed by the computation unit. In fact, each second amplification module is laid out for amplifying the first corrected electromotive force so that each second corrected electromotive force has an amplitude that corresponds essentially to that of the supply voltage of the computation unit and a predetermined average value essentially equal to half of the supply voltage of the computation unit.

In another variant, each second amplification module allows amplifications with at least two possible gain ranges, wherein each gain range is selected by the computation unit depending on the value of the continuous voltage signal Umot.

In a preferred embodiment, each second amplification module has at least three possible gain ranges, wherein
- the first gain range is selected by the computation unit if the value of the continuous voltage signal Umot is comprised between 0V and a first fraction of the maximum voltage of the continuous voltage signal Umot, for example and in a non-limiting way between 0V and approx. 5% of Umot, for example between 0V and 1.5V for Umot=32V;
- the second gain range is selected by the computation unit if the value of the continuous voltage signal Umot is comprised between 0V and a second fraction of the maximum voltage of the continuous voltage signal Umot, wherein the second fraction is greater than the first fraction, for example, and in a non-limiting manner, between 0V and approx. 20% of Umot, for example between 0V and 7V for Umot=32V.
- the third gain range is selected by the computation unit if the value of the continuous voltage signal Umot is comprised between 0V and the maximum voltage of the continuous voltage signal Umot, for example and in a non-limiting manner between 0V and 32V.

In this case, the computation unit is laid out for selecting the gain range that yields the greatest amplification if two or three gain ranges are possible for the same value of the continuous voltage signal.

In a preferred embodiment, each second amplification module comprises a second operational amplifier, at least three resistors and at least one switch connected serially with at least one of these resistors. The computation unit is laid out to control at least one switch according to the value of the continuous voltage signal Umot.

Advantageously, the ratio between these resistors is determined as a function of the supply voltage of the computation unit.

Advantageously, each second amplification module is laid out for generating the second corrected electromotive force from the first corrected electromotive force and from a second reference voltage signal, which can be determined as a function of the supply voltage of the computation unit.

Since the motor M is a brushless motor, i.e. without collector, by means of a PLL (Phase-Locked Loop) synchronized on the crossings of the electromotive forces with PN, the computation unit constructs a continuous evolution of the rotation angle of the motor that enables the angles of commutation of the coils and of the EMF selector to be determined. Indeed, the EMFs, which are selected by the computation unit, cross PN six times (at 30°, 90°, 150°, 210°, 270°, 330°), whilst the coil commutations must occur at 0°, 60°, 120°, etc.

According to an independent aspect of the invention, the computation unit allows this sensorless brushless motor M to be servo-controlled in position and not in speed. In fact, the computation unit constructs another signal (saw tooth) that is virtual and synchronized on the required speed. The two signals (two saw teeth) are compared so as to extract a tracking error which, multiplied by a gain, yields the motor voltage Umot.

Therefore, once the motor signal is synchronized on the virtual one (position servo-control), it yields an angular rotation as accurate as the quartz frequency of the computation unit, whence a rotation accuracy of 0.1%.

This type of position servo-control, unlike known solutions where the motor is servo-controlled in speed, since it is based on the amplitude of the electromotive forces, is extremely reactive and accurate: laboratory tests performed by the applicant have shown that it is possible to control the angular tracking of the rotor even if a motor turning at 40'000 rpm is stopped by an external blocking on 0.5 turn.

BRIEF DESCRIPTION OF THE FIGURES

Examples of embodiments of the invention are indicated in the description illustrated by the attached figures in which.

EXAMPLE(S) OF EMBODIMENTS OF THE INVENTION

Figure 7:
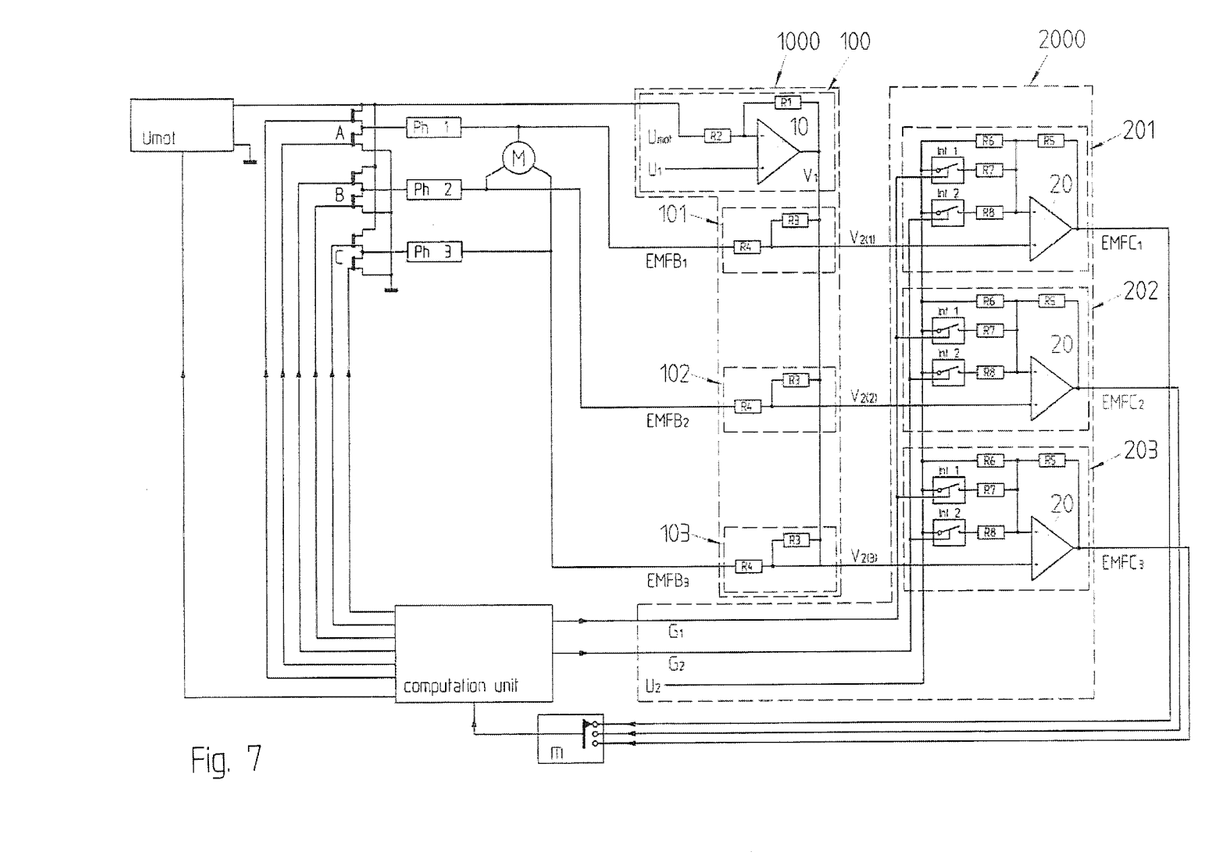
FIG. 7 illustrates an example of embodiment of the device according to the invention.

FIG. 7 illustrates an example of embodiment of the device for controlling a sensorless brushless motor according to the invention. Its first part 1000 comprises notably:
a first amplification module 100 common to the motor phases and laid out for generating an intermediary voltage signal V1,
a voltage divider 101, 102, 103 for each motor phase, between the nodes on which are generated respectively each electromotive force EMFB1, EMFB2, EMFB3 in raw state taken directly on the motor phase of a sensorless brushless motor M and the node on which the intermediary voltage signal V1 is generated.

Each voltage divider 101, 102, 103 is laid out for generating a first corrected electromotive force V2(1), V2(2), V2(3) having a predetermined average value and which is used by a computation unit in order to control the motor M on the basis of these first corrected electromotive forces V2(1), V2(2), V2(3), notably in order to calculate the position of the motor's rotor.

Advantageously, the predetermined average value is essentially equal to half of the value of the supply voltage Zadc of the computation unit.

According to the invention, therefore, the first corrected electromotive forces V2(1), V2(2), V2(3) are automatically centered on the average of the supply voltage of the computation unit without using AGCs or feedback loops with the computation unit. In other words, by using only hardware components, notably the first amplification module 100 and the voltage dividers 101, 102, 103 for each motor phase, it is possible to center in an accurate and reliable manner the average of the EMFs so that they are essentially identical to half of the supply voltage of the computation unit.

In the variant of FIG. 7, the first amplification module 100 is laid out for generating on a node of the circuit the intermediary voltage signal V1 from the continuous voltage signal Umot and from a first reference voltage signal U1. Advantageously, this first reference voltage signal is determined as a function of the supply voltage Zadc of the computation unit.

In the variant embodiment of FIG. 7, the first amplification module 100 comprises a first operational amplifier 10 and two resistors R1, R2. Advantageously, the ratio between these resistors R1/R2 is determined as a function of the supply voltage Zadc of the computation unit. This solution is non-limiting and any other configuration allowing amplification with hardware components can be conceived.

Advantageously, the first amplification module 100 and each voltage divider 101, 102, 103 also allow each first corrected electromotive force V2(1), V2(2), V2(3) to have a maximum value lower than or at most equal to the supply tension Zadc of the computation unit and a minimum value greater than or at most equal to 0V. In other words, the inventive device enables the first corrected electromotive forces V2(1), V2(2), V2(3) to be compatible with the acquisition zone of the computation unit [0, Zadc], whilst avoiding saturations.

In the embodiment of FIG. 7, the device also comprises a second part 2000, comprising a second amplification module 201, 202, 203 for each motor phase, wherein each second amplification module 201, 202, 203 being laid out for amplifying the first corrected electromotive force V2(1), V2(2) respectively V2(3) in a variable manner as a function of the continuous voltage signal Umot and for generating a second corrected electromotive force EMFC1, EMFC2 respectively EMFC3. In this variant embodiment, the computation unit is laid out for calculating the rotor's position of the motor M on the basis of these second corrected electromotive forces EMFC1, EMFC2 and EMFC3.

In other words, in this latter embodiment, it is possible to modify the electromotive forces gain according to the motor speed, i.e. to Umot, so as to maintain amplitudes that can be processed by the computation unit, notably in the case of low rotation speeds of the motor.

In fact, each second amplification module 201, 202, 203 is laid out for amplifying the first corrected electromotive force V2(1), V2(2) respectively V2(3) so that each second corrected electromotive force EMFC1, EMFC2 respectively EMFC3 has an amplitude that corresponds essentially to that of the supply voltage Zadc of the computation unit and a predetermined average value essentially equal to half of the supply voltage Zadc/2 of the computation unit.

In another variant, each second amplification module 201, 202, 203 allows amplifications with at least two possible gain ranges, wherein each gain range is selected by the computation unit depending on the value of the continuous voltage signal Umot.

Figure 13:
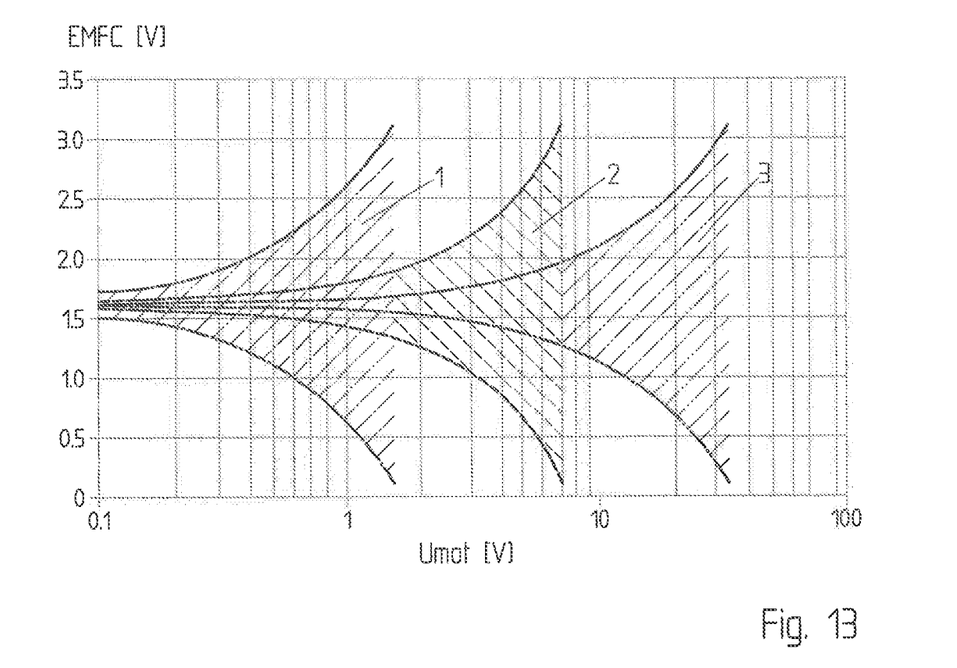
FIG. 13 illustrates an example of distribution of gain ranges of the EMFs that is allowed by a variant embodiment of the device according to the invention.

In the variant embodiment illustrated in FIGS. 7 and 13, each second amplification module has at least three possible gain ranges, wherein:

The first gain range is selected by the computation unit if the value of the continuous voltage signal Umot is comprised between 0V and a first fraction of the maximum voltage of the continuous voltage signal Umot, for example and in a non-limiting way between 0V and approx. 5% of Umot, for example between 0V and 1.5V for Umot=32V. In other words, as soon as Umot>1.6V, the EMFs saturate the computation unit. Therefore the first gain range is valid as long as Umot<1.6 V.

The second gain range is selected by the computation unit if the value of the continuous voltage signal Umot is comprised between 0V and a second fraction of the maximum voltage of the continuous voltage signal Umot, wherein the second fraction is greater than the first fraction; for example, and in a non-limiting manner, between 0V and approx. 20% of Umot, for example between 0V and 7V for Umot=32V. In other words, as soon as Umot>7V, the EMFs saturate the computation unit. Therefore the second gain range is valid as long as Umot<7V.

The third gain range is selected by the computation unit if the value of the continuous voltage signal Umot is comprised between 0V and the maximum voltage of the continuous voltage signal Umot, for example and in a non-limiting manner between 0V and 32V.

In this case, the computation unit is laid out for selecting the gain range that yields the greatest amplification if two or three gain ranges are possible for the same value of the continuous voltage signal Umot. For example, with reference to FIG. 13, if Umot=1V, the computation unit will select the gain range 1 instead of 2 or 3 which would also be possible, since the gain range 1 for Umot=1V yields an amplification greater than that given by the gain ranges 2 or 3.

In the variant embodiment of FIG. 7, each second amplification module 201, 202, 203 comprises a second operational amplifier 20, four resistors R5, R6, R7, R8 and two switches, notably Int1 connected serially with R7 and Int2 in series with R8. The computation unit is laid out to control each switch Int1, Int2 by means of the control signals G1 resp. G2 according to the value of the continuous voltage signal Umot.

Thus, if Umot has a value enabling the first gain range to be selected, the switches Int1 and Int2 will remain open and the gain of each second amplification module will be proportional to the ratio of the resistors R5 and R6.

If Umot has a value enabling the second gain range to be selected, the control signal G1 will close the switch Int1 of the second amplification module (with the switch Int2 remaining open) so that its gain will be proportional to the ratio of the resistor R5 and of the parallel between R6 and R7.

If Umot has a value enabling the third gain range to be selected, the control signal G2 will close the switch Int2 of the second amplification module (with the switch Int1 being open) so that its gain will be proportional to the ratio of the resistor R5 and of the parallel between R6 and R8.

Advantageously, the ratio between these resistors R5, R6, R7 et R8 is determined as a function of the supply voltage Zadc of the computation unit.

Advantageously, each second amplification module is laid out for generating the second corrected electromotive force EMFC1, EMFC2 respectively EMFC3 from the first corrected electromotive force V2(1), V2(2) respectively V2(3) and from a second reference voltage signal U2, which is advantageously equal to half of the supply voltage Zadc of the computation unit (U2=Zadc/2).

Example for calculating U1, U2, k1, k2, k3(0), k3(1), k3(2)

Hereinafter is a non-limiting example for calculating the first and second reference voltage U1 resp. U2 and the following constants, defined with reference to the embodiment of FIG. 7:

$$k1 = R1/R2$$

$$k2 = R3/R4$$

$$k3(0) = R5/R6$$

$$k3(1) = R5/(R6//R7)$$

$$k3(2) = R5/(R6//R8)$$

These calculations refer to a computation unit having a supply voltage Zadc=3.3V, i.e. an analog acquisition zone belonging to the range [0; 3.3V] and a continuous voltage Umot comprised between 0V and 32V, i.e. having a minimum value of 0V and a maximum value of 32V.

At the same time the control device according to the invention makes it possible to:

1. Eliminate any possibility of saturation of the first corrected electromotive forces outside the range [0; Zadc].

2. Maintain the average of the extreme values of the first corrected electromotive forces at the center of the range [0; Zadc].

The function of the first amplification module and of each voltage divider can be described by the following formulae:

$$V_1 = (1+k_1) \cdot U_1 - (k_1 \cdot U_{mot}) \quad (1)$$

$$V_2 = [(1-k_2) \cdot V_1] + (k_2 \cdot EMFB_n) \quad (2)$$

wherein V2 (or V2($i$)) indicates any of the first corrected electromotive forces V2(1), V2(2), V2(3) of FIG. 7.

Let the first corrected maximum electromotive forces V2($i$) be comprised between 0.1V and 3.2V (i.e. with a lower and upper margin equal for example and in a non-limiting way to 0.1V relative to the range [0; Zadc]) for a motor M turning under 32V.

If the motor's speed is constant, Umot is constant and so is V1. One can then extract V1 from the equation (2):

$$V_1 = \frac{V_2 - k_2 \cdot EMFB_n}{1 - k_2} \quad (3)$$

Since V1 is constrained, it is possible to write the equality in the equation (3) for V2=0.1 V and 3.2 V:

$$\frac{0.1}{1-k_2} = \frac{3.2 - k_2 \cdot 32}{1-k_2} \quad (4)$$

whence $$k_2 = 0.0968$$

When considering the voltage Umot=0V (motor stopped), although the first corrected electromotive forces are non-existing, let the level of the first corrected electromotive forces V2($i$) be on the average of Zadc, i.e. 3.3/2V=1.65V.

From the equation (3) it is possible to define V1:

$$V_{1(Umot=0)} = \frac{1.65}{1-0.0968} = 1.827 \quad (5)$$

When considering the voltage Umot=32V, let V2 also be at 1.65V when the voltage EMFB=Umot/2=16V:

$$V_{1(Umot=32)} = \frac{1.65 - 0.0968}{1 - 0.0968} = 0.112 \quad (6)$$

From the equation (1), it is possible to extract the value of U1. Given that U1 is constant for Umot=0V and Umot=32 V, it is possible to find the value of k1 and thus of U1.

$$k_1 = 0.0536 \quad (7)$$

$$U_1 = 1.734 [V] \quad (8)$$

Figure 8:
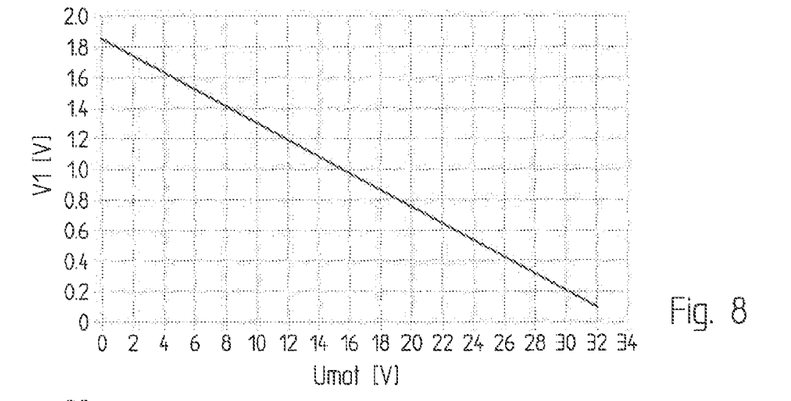
FIG. 8 illustrates an example of intermediary voltage signal V1 as a function of the voltage Umot of the voltage regulator of the device according to the invention.

FIG. 8 illustrates an example of the intermediary voltage signal V1 as a function of the voltage Umot of the voltage regulator of the device according to the invention as measured during laboratory tests performed by the applicant.

Figure 9:
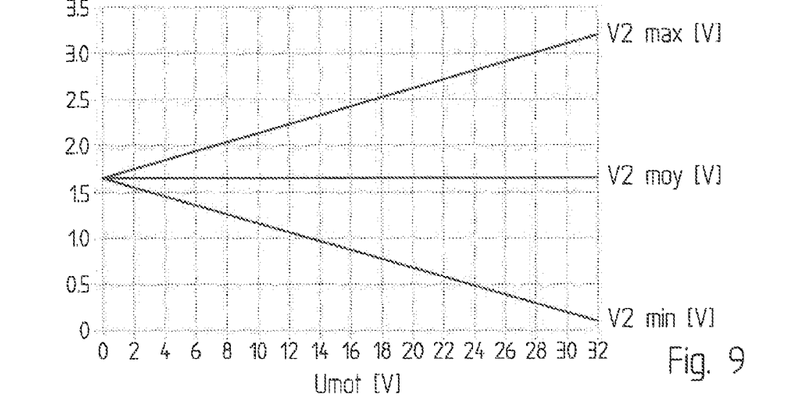
FIG. 9 illustrates an example of first corrected maximum, minimum and average electromotive force as a function of the tension Umot of the voltage regulator of the device according to the invention.

As illustrated in FIG. 9, which shows an example of first maximum (V2max), minimum (V2min) and average (V2moy) electromotive force corrected according to the voltage Umot of the voltage regulator of the device according to the invention, each first corrected electromotive force V2 has an average value essentially equal to half of the value of the supply voltage Zadc of the computation unit (in this case Zadc/2=3.3/2V=1.65V). Furthermore, the average value of the first corrected electromotive forces is constant independently of the voltage value Umot of the voltage regulator signal. Finally, each first corrected electromotive force V2 or V2(i) has a maximum value lower than or at most equal to the supply voltage of the computation unit (3.3V) and a minimum value greater than or at most equal to 0V, which makes it possible to eliminate any possibility of saturation of the first electromotive forces outside the range [0; Zadc].

In a preferred embodiment, the control device according to the invention also makes it possible to:

3. Modify the gain of the electromotive forces according to the motor speed (i.e. as a function of Umot), so as to maintain amplitudes compatible with the supply voltage of the computation unit.

Indeed, as discussed here above, k1, U1 and k2, or in other words the first amplification module 100 and each voltage divider 101, 102, 103 (the first part 1000 of the device of FIG. 7) make it possible to eliminate any possibility of saturation of the first electromotive forces outside the range [0; Zadc]. However, it can be desirable to have several gain ranges according to the voltage Umot, which is advantageous notably in the case of a low rotation speed of the motor.

For this reason, it is possible to introduce into the inventive device a second amplification module 201, 202, 203 (the second part 2000 of the device of FIG. 7) for each motor phase, which makes it possible to amplify each first corrected electromotive force V2(1), V2(2), V2(3) in a variable manner as a function of the continuous voltage signal Umot and to generate second corrected electromotive forces EMFC1, EMFC2 respectively EMFC3. The computation unit will thus calculate the rotor's position on the basis of these second corrected electromotive forces EMFC1, EMFC2, EMFC3.

It is possible to define two or several gain ranges. For example and in a non-limiting manner, it is possible to define three gain ranges, namely:

range I: Umot∈[0V; 1.5V]
range II: Umot∈[0V; 7V]
range III: Umot∈[0V; 32V].

1.5V and 7V are of course examples of first resp. second fraction of the maximum voltage (32V) of the continuous voltage signal, and any other different value can be chosen.

The function of each second amplification module can be described by the following formula:

$$EMFC_n = [(V_2 + U_2) \cdot k_3] + U_2 \quad (9)$$

U2 is half of the supply voltage of the computation unit, i.e. U2=Zadc/2. For Zadc=3.3V, U2=1.65V.

For each range, let Umot=1.5V, 7V respectively 32V, V2 is calculated with (2) and EMFC is set to be equal to 3.2V (i.e. Zadc with the margin of 0.1V). it is thus possible to determine:

$$k_{3(0)} = 1.000 \quad (10)$$

$$k_{3(1)} = 4.575 \quad (11)$$

$$k_{3(2)} = 21.32 \quad (12)$$

Figure 10:
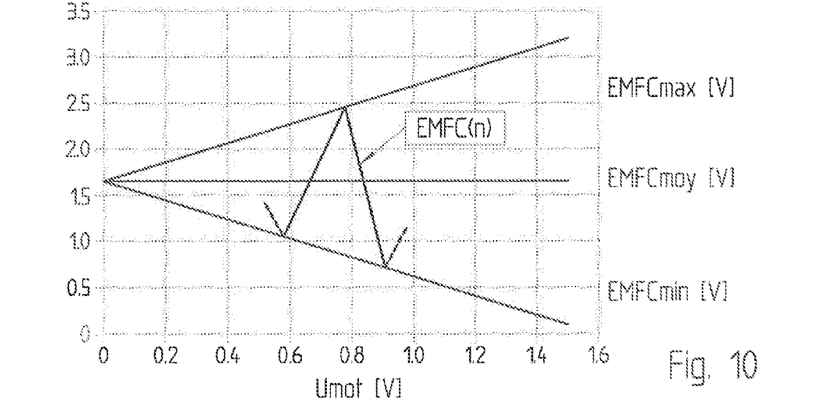
FIG. 10 illustrates an example of second corrected maximum, minimum and average electromotive force as a function of the tension Umot of the voltage regulator of the device according to the invention.
Figure 11:
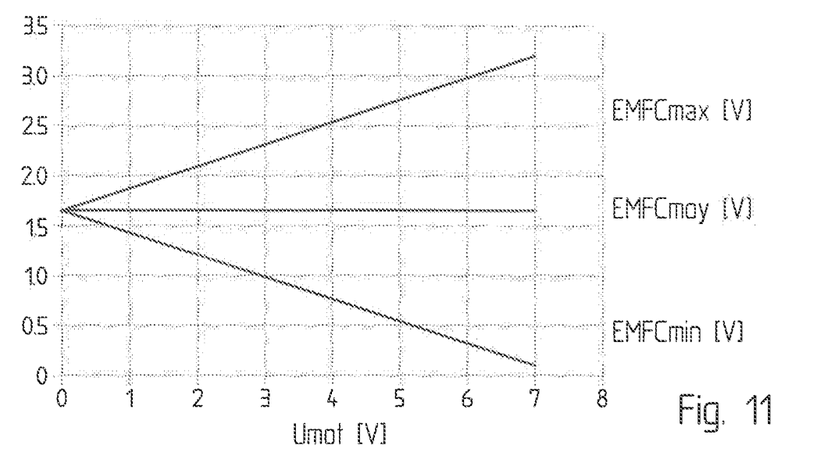
FIG. 11 illustrates another example of second corrected maximum, minimum and average electromotive force as a function of the tension Umot of the voltage regulator of the device according to the invention.
Figure 12:
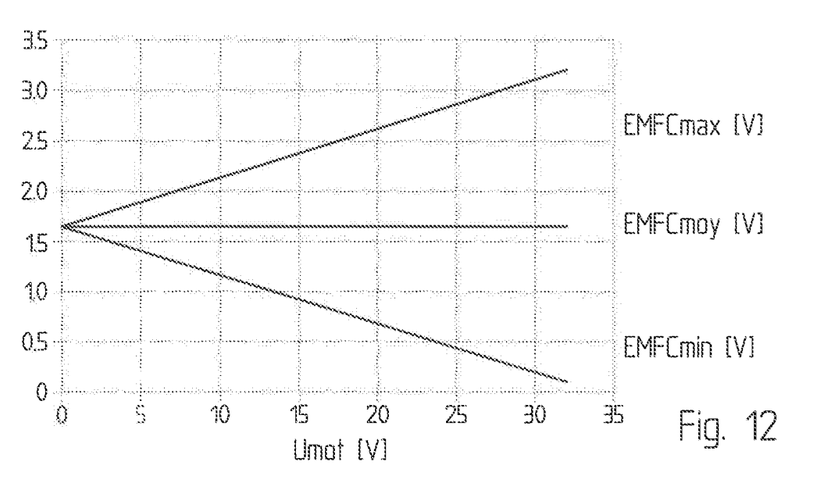
FIG. 12 illustrates another example of second corrected maximum, minimum and average electromotive force as a function of the tension Umot of the voltage regulator of the device according to the invention.

FIGS. 10, 11 resp. 12 illustrate an example of second corrected maximum (EMFCmax), minimum (EMFCmin) and average (EMFmoy) electromotive force as a function of the voltage Umot of the voltage regulator of the device according to the invention, for each range of Umot corresponding to each gain range.

As illustrated in each of the FIGS. 10 to 12, each second corrected electromotive force EMFC has a maximum value equal to the supply voltage Zadc of the computation unit and a minimum value greater than or at most equal to 0V. In this manner, it is possible for example to avoid problems associated with low and high rotation speeds.

Furthermore, each second corrected electromotive force EMFC has an average value essential equal to half of the value of the supply voltage Zadc of the computation unit (in this case Zadc/2=3.3/2V=1.65V). Furthermore, the average value of the first corrected electromotive forces is constant independently of the voltage value Umot of the voltage regulator signal.

FIG. 13 illustrates an example of distribution of the gain ranges 1, 2, 3 of the second corrected electromotive forces that are allowed by a variant embodiment of the device according to the invention.

REFERENCE NUMBERS USED IN THE FIGURES

1 First gain range
2 Second gain range
3 Third gain range
10 First operational amplifier
20 Second operational amplifier
100 First amplification module
101 First voltage divider
102 Second voltage divider
103 Third voltage divider
201 to 203 Second amplification modules
1000 First part of the control device
2000 Second part of the control device
M Sensorless brushless motor
Ph1 to Ph3 Phases of the motor M
A, B, C Commutators
Udc Continuous and fixed voltage of the voltage regulator
Umot Continuous voltage of the voltage regulator
PWM #1 Pulse Width Modulation circuits to #3

V+, Hi, 0V Three possible states of each commutator A, B, C
PN Neutral point of the motor M
m Multiplexer
Zadc Supply voltage of the computation unit (analog acquisition zone)
Uemf EMFs in raw state
U1 First reference voltage signal
U2 Second reference voltage signal
Int1 First switch
Int2 Second switch
G1 Control signal of the switch Int1
G2 Control signal of the switch Int2
EMFB1 to Electromotive forces in raw state EMFB3
EMFC1 to Second corrected electromotive forces EMFC3
R1 to R8 Resistors
Int1-Int2 Switches
V1 Intermediary voltage signal
V2(1) to First corrected electromotive forces V2(3)

The invention claimed is:

1. Sensorless brushless motor control device, comprising:
a first amplification module common to all motor phases and laid out for generating an intermediary voltage signal as a function of a continuous voltage signal,
a voltage divider between each motor phase and a node on which the intermediary voltage signal is generated by the first amplification module, wherein each voltage divider is laid out for generating a first corrected electromotive force,
a computation unit laid out for controlling the motor on the basis of said first corrected electromotive forces.

2. The device of claim 1, also comprising:
a continuous voltage regulator laid out for generating a continuous voltage signal, having a voltage comprised between a maximum value and a minimum value,
commutators laid out for distributing sequentially the continuous voltage signal to the phases of said motor.

3. The device of claim 1, wherein said first amplification module comprises a first operational amplifier and two resistors.

4. Sensorless brushless motor control device, comprising:
a first amplification module common to the motor phases and laid out for generating an intermediary voltage signal,
a voltage divider between each motor phase and a node on which the intermediary voltage signal is generated, wherein each voltage divider is laid out for generating a first corrected electromotive force,
a computation unit laid out for controlling the motor on the basis of said first corrected electromotive forces, wherein each first corrected electromotive force has an average value essentially equal to half of the value of the supply voltage of said computation unit.

5. The device of claim 4, wherein said average value of said first corrected electromotive forces is constant independently of the voltage value of said continuous tension signal.

6. Sensorless brushless motor control device, comprising:
a first amplification module common to the motor phases and laid out for generating an intermediary voltage signal,
a voltage divider between each motor phase and a node on which the intermediary voltage signal is generated, wherein each voltage divider is laid out for generating a first corrected electromotive force,
a computation unit laid out for controlling the motor on the basis of said first corrected electromotive forces,
a continuous voltage regulator laid out for generating a continuous voltage signal, having a voltage comprised between a maximum value and a minimum value,
commutators laid out for distributing sequentially the continuous voltage signal to the phases of said motor,
wherein each first corrected electromotive force has a maximum value lower than or at most equal to the supply voltage of the computation unit and a minimum value greater than or at most equal to 0V.

7. Sensorless brushless motor control device, comprising:
a first amplification module common to the motor phases and laid out for generating an intermediary voltage signal,
a voltage divider between each motor phase and a node on which the intermediary voltage signal is generated, wherein each voltage divider is laid out for generating a first corrected electromotive force,
a computation unit laid out for controlling the motor on the basis of said first corrected electromotive forces,
a continuous voltage regulator laid out for generating a continuous voltage signal, having a voltage comprised between a maximum value and a minimum value,
commutators laid out for distributing sequentially the continuous voltage signal to the phases of said motor,
wherein said first amplification module is laid out for generating said intermediary voltage signal from said continuous voltage signal and from a first reference voltage signal.

8. The device of claim 7, wherein said first reference voltage signal is determined as a function of said supply voltage of said computation unit.

9. Sensorless brushless motor control device, comprising:
a first amplification module common to the motor phases and laid out for generating an intermediary voltage signal,
a voltage divider between each motor phase and a node on which the intermediary voltage signal is generated, wherein each voltage divider is laid out for generating a first corrected electromotive force,
a computation unit laid out for controlling the motor on the basis of said first corrected electromotive forces,
wherein said first amplification module comprises a first operational amplifier and two resistors, and
wherein the ratio between the two said resistors is determined as a function of said supply voltage of said computation unit.

10. Sensorless brushless motor control device, comprising:
a first amplification module common to the motor phases and laid out for generating an intermediary voltage signal,
a voltage divider between each motor phase and a node on which the intermediary voltage signal is generated, wherein each voltage divider is laid out for generating a first corrected electromotive force,
a computation unit laid out for controlling the motor on the basis of said first corrected electromotive forces,
a second amplification module for each motor phase,
wherein each second amplification module is laid out for amplifying each said first corrected electromotor force in a variable manner as a function of said continuous voltage signal and for generating a second corrected electromotive force,
wherein said computation unit is laid out for calculating said rotor's position on the basis of said second corrected electromotive forces.

11. The device of claim 10, wherein each second amplification module is laid out for amplifying said first corrected electromotive force so that each second corrected electromotive force has an amplitude that corresponds essentially to that of the supply voltage of said computation unit and a predetermined average value essentially equal to half of the supply voltage of said computation unit.

12. The device of claim 10, wherein each second amplification module has at least two possible gain ranges, wherein each gain range is selected by said computation unit depending on the value of said continuous voltage signal.

13. The device of claim 10, wherein each second amplification module comprises:
   a second operational amplifier, at least three resistors and at least one switch connected serially with at least one of these at least three resistors,
   wherein said computation unit is laid out to control, by means of at least one control signal, said at least one switch according to the value of said continuous voltage signal.

14. The device of claim 13, wherein the ratio between said at least three resistors is determined as a function of said supply voltage of the computation unit.

15. The device of claim 10, wherein each second amplification module is laid out for generating each second corrected electromotive force from said first corrected electromotive forces and from a second reference voltage signal essentially equal to half of said supply voltage of said computation unit.

* * * * *

UNITED STATES PATENT AND TRADEMARK OFFICE
CERTIFICATE OF CORRECTION

PATENT NO. : 9,041,330 B2
APPLICATION NO. : 13/792630
DATED : May 26, 2015
INVENTOR(S) : Jean-Pierre Voillat It is certified that error appears in the above-identified patent and that said Letters Patent is hereby corrected as shown below:

In the specification, column 11, equation 6, please replace " $V_{1(l/mol=32)} = \dfrac{1.65 - 0.0968}{1 - 0.0968} = 0.112$ "

with -- $V_{1(l/mol\cdot 32)} = \dfrac{1.65 - 0.0968 \cdot 16}{1 - 0.0968} = 0.112$ --

Signed and Sealed this
Twenty-third Day of February, 2016

Michelle K. Lee
*Director of the United States Patent and Trademark Office*